United States Patent
Wang et al.

(10) Patent No.: US 12,444,413 B2
(45) Date of Patent: Oct. 14, 2025

(54) CONTEXTUAL SPELLING CORRECTION (CSC) FOR AUTOMATIC SPEECH RECOGNITION (ASR)

(71) Applicant: Microsoft Technology Licensing, LLC, Redmond, WA (US)

(72) Inventors: Xiaoqiang Wang, Beijing (CN); Yanqing Liu, Beijing (CN); Sheng Zhao, Beijing (CN); Jinyu Li, Bellevue, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 198 days.

(21) Appl. No.: 17/823,887

(22) Filed: Aug. 31, 2022

(65) Prior Publication Data
US 2022/0415314 A1    Dec. 29, 2022

Related U.S. Application Data

(63) Continuation of application No. PCT/CN2021/099993, filed on Jun. 15, 2021.

(51) Int. Cl.
*G10L 15/16*    (2006.01)
*G10L 15/19*    (2013.01)

(52) U.S. Cl.
CPC .............. *G10L 15/19* (2013.01); *G10L 15/16* (2013.01)

(58) Field of Classification Search
CPC ... G10L 15/19; G10L 15/16; G10L 2015/228; G10L 15/1815
See application file for complete search history.

(56) References Cited

U.S. PATENT DOCUMENTS 5,386,494 A * 1/1995 White ............... G06F 3/167
                                        704/E15.04
6,513,005 B1  1/2003 Qin et al.
(Continued)

FOREIGN PATENT DOCUMENTS

CN       112071318 A    12/2020
WO    2020256838 A1    12/2020

OTHER PUBLICATIONS

Lertpiya, A., Chalothorn, T., & Chuangsuwanich, E. (2020). Thai spelling correction and word normalization on social text using a two-stage pipeline with neural contextual attention. IEEE Access, 8, 133403-133419. (Year: 2020).*

(Continued)

*Primary Examiner* — Paras D Shah
*Assistant Examiner* — Mulugeta Tuji Dugda
(74) *Attorney, Agent, or Firm* — Foley IP Law, PLLC

(57) ABSTRACT

Novel solutions for speech recognition provide contextual spelling correction (CSC) for automatic speech recognition (ASR). Disclosed examples include receiving an audio stream; performing an ASR process on the audio stream to produce an ASR hypothesis; receiving a context list; and, based on at least the ASR hypothesis and the context list, performing spelling correction to produce an output text sequence. A contextual spelling correction (CSC) model is used on top of an ASR model, precluding the need for changing the original ASR model. This permits run-time user customization based on contextual data, even for large-size context lists. Some examples include filtering ASR hypotheses for the audio stream and, based on at least the ASR hypotheses filtering, determining whether to trigger spelling correction for the ASR hypothesis. Some examples include generating text to speech (TTS) audio using prepro- (Continued)

cessed transcriptions with context phrases to train the CSC model.

18 Claims, 8 Drawing Sheets

(56) References Cited

U.S. PATENT DOCUMENTS

| | | | |
|---|---|---|---|
| 8,332,218 B2 | 12/2012 | Cross et al. | |
| 9,858,925 B2 | 1/2018 | Gruber et al. | |
| 10,332,518 B2 | 6/2019 | Garg et al. | |
| 10,388,272 B1* | 8/2019 | Thomson | G10L 15/22 |
| 2002/0072914 A1 | 6/2002 | Alshawi et al. | |
| 2014/0025380 A1* | 1/2014 | Koch | G10L 15/30 |
| | | | 704/E15.005 |
| 2017/0178625 A1* | 6/2017 | Mamou | G10L 15/26 |
| 2020/0175961 A1* | 6/2020 | Thomson | G10L 15/28 |
| 2020/0243074 A1 | 7/2020 | Taki et al. | |
| 2020/0349922 A1 | 11/2020 | Peyser et al. | |
| 2020/0402501 A1* | 12/2020 | Prabhavalkar | G10L 15/187 |
| 2021/0142789 A1* | 5/2021 | Gurbani | G10L 15/26 |

OTHER PUBLICATIONS

Arup Sarma and David D. Palmer, "Context-based Speech Recognition Error Detection and Correction," Proceedings of HLT-NAACL 2004: Short Papers, 2004, aclanthology.org (Year: 2004).*

Bruguier, et al., "Phoebe: Pronunciation-aware Contextualization for End-to-End Speech Recognition", In Proceedings of IEEE International Conference on Acoustics, Speech and Signal Processing, May 12, 2019, pp. 6171-6175.

Fusayasu, et al., "Word-Error Correction of Continuous Speech Recognition Based on Normalized Relevance Distance", In Proceedings of Twenty-Fourth International Joint Conference on Artificial Intelligence, Jun. 23, 2015, pp. 1257-1262.

Graves, Alex, "Sequence Transduction with Recurrent Neural Networks", In Repository of arXiv:1211.3711v1, Nov. 14, 2012, 9 Pages.

Guo, et al., "A Spelling Correction Model for End-to-End Speech Recognition", In Proceedings of IEEE International Conference on Acoustics, Speech and Signal Processing, May 12, 2019, pp. 5651-5655.

"International Search Report and Written Opinion Issued in PCT Application No. PCT/CN21/099993", Mailed Date: Nov. 25, 2021, 10 Pages.

Pundak, et al., "Deep Context: End-to-End Contextual Speech Recognition", In Repository of arXiv:1808.02480v1, Aug. 7, 2018, 8 Pages.

Ren, et al., "Almost Unsupervised Text to Speech and Automatic Speech Recognition", In Proceedings of the 36th International Conference on Machine Learning, May 24, 2019, 10 Pages.

Ren, et al., "FastSpeech: Fast, Robust and Controllable Text to Speech", In Proceedings of the 33rd Conference on Neural Information Processing Systems, Dec. 8, 2019, 10 Pages.

Sarma, et al., "Context-based Speech Recognition Error Detection and Correction", In Proceedings of HLT-NAACL: Short Papers, May 2, 2004, 4 Pages.

Tjandra, et al., "Machine Speech Chain with One-Shot Speaker Adaptation", In Repository of arXiv:1803.10525v1, Mar. 28, 2018, 12 Pages.

Valin, et al., "LPCNet: Improving Neural Speech Synthesis Through Linear Prediction", In Repository of arXiv: 1810.11846v2, Feb. 19, 2019, 5 Pages.

Williams, et al., "Contextual Speech Recognition in End-to-End Neural Network Systems Using Beam Search", In Journal of 19th Annual Conference of the International Speech Communication Association, Sep. 2, 2018, pp. 2227-2231.

Zhao, et al., "Shallow-Fusion End-to-End Contextual Biasing", In Journal of 20th Annual Conference of the International Speech Communication Association, Sep. 15, 2019, pp. 1418-1422.

Communication pursuant to Article 94(3) EPC, Received for European Application No. 21742300.3, mailed on May 13, 2025, 4 pages.

Notice of First Office Action Received for Chinese Application No. 202180052809.7, mailed on Aug. 20, 2025, 15 pages (English Translation Provided).

* cited by examiner

CONTEXTUAL SPELLING CORRECTION (CSC) FOR AUTOMATIC SPEECH RECOGNITION (ASR)

CROSS-REFERENCE TO RELATED APPLICATIONS

This application is a continuation of International Application No. PCT/US2021099993, filed Jun. 15, 2021.

BACKGROUND

Automatic speech recognition (ASR) is used for purposes such as inputs to digital assistants, for example to initiate phone calls, compose messages, and manage calendar events. However, such purposes typically require matching ASR results with context-specific words, such as contact list names. Unfortunately, some contact list names have unique spelling that may not match ASR results, resulting in failed attempts. Other specialized language, such as obscure medical and other industry-specific terminology, may also increase word error rate (WER), resulting in misspellings for transcriptions.

Prior solutions such as a contextual language model (LM), which provides on the fly re-scoring with a biased finite-state machine (FST), and a biased encoder, which requires customized training, typically suffer from degraded performance problems. Degraded performance may manifest as high latency for long context lists (e.g., lists of context-specific words, such as contact list names and specialized terminology). Compounding the challenges with prior solutions is the dynamic nature of many context lists preventing context-specific words to be unavailable during ASR training, for some scenarios.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Solutions for speech recognition provide contextual spelling correction (CSC) for automatic speech recognition (ASR). Disclosed examples include receiving an audio stream; performing an ASR process on the audio stream to produce an ASR hypothesis; receiving a context list; and, based on at least the ASR hypothesis and the context list, performing spelling correction to produce an output text sequence. A contextual spelling correction (CSC) model is used on top of an ASR model, precluding the need for changing the original ASR model. This permits run-time user customization based on contextual data, even for large-size context lists. Some examples include filtering ASR hypotheses for the audio stream and, based on at least the ASR hypotheses filtering, determining whether to trigger spelling correction for the ASR hypothesis. Some examples include generating text to speech (TTS) audio using preprocessed transcriptions with context phrases to train the CSC model.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
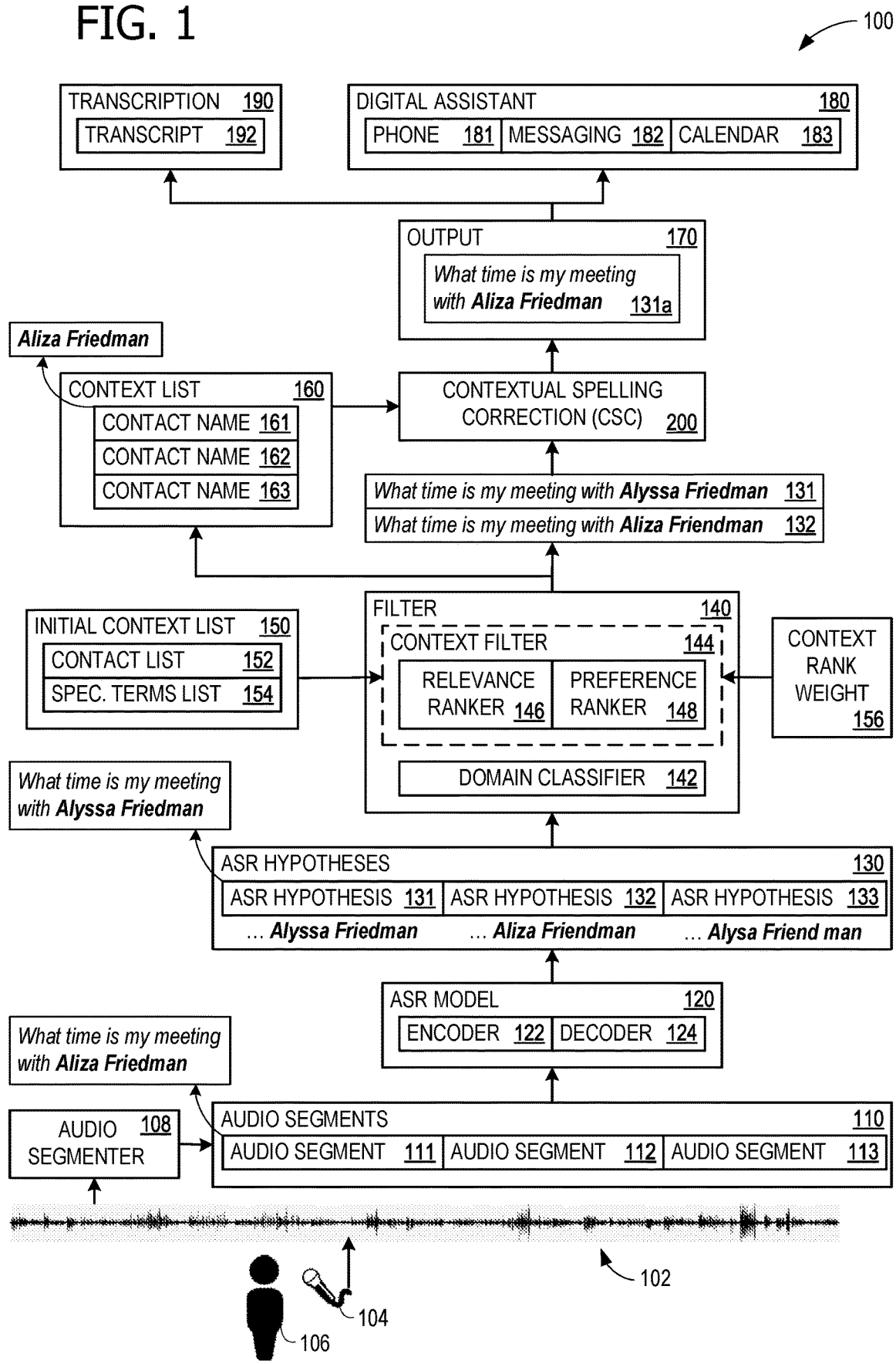
FIG. 1 illustrates an arrangement for speech recognition that advantageously employs contextual spelling correction (CSC) for automatic speech recognition (ASR)

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Novel solutions for speech recognition provide contextual spelling correction (CSC) for automatic speech recognition (ASR). Disclosed examples include receiving an audio stream; performing an ASR process on the audio stream to produce an ASR hypothesis; receiving a context list; and, based on at least the ASR hypothesis and the context list, performing spelling correction to produce an output text sequence. A contextual spelling correction (CSC) model is used on top of an ASR model, precluding the need for changing the original ASR model. This permits run-time user customization based on contextual data, even for large-size context lists. Some examples include filtering ASR hypotheses for the audio stream and, based on at least the ASR hypotheses filtering, determining whether to trigger spelling correction for the ASR hypothesis. Some examples include generating text to speech (TTS) audio using preprocessed transcriptions with context phrases to train the CSC model.

Aspects of the disclosure improve the speed and accuracy of speech recognition by receiving a context list and, based on at least the ASR hypothesis and the context list, performing spelling correction to produce an output text sequence. This approach avoids latency that occurs with long context lists when biased ASR encoders are used and also avoids performance issues associated with contextual language model (LM) solutions that alter the ASR decoding process.

The disclosed CSC model corrects context-related recognition errors in transducer-based ASR systems. Context information is incorporated into a spelling correction model with a shared context encoder and filtering is used to handle large-size context lists. In some examples, word error rate (WER) may be reduced by approximately half, even for out-of-vocabulary terms not seen during training (e.g., personal names). By using a standalone correction model, which does not change the original transducer model structure, there is no performance degradation risk for the baseline ASR model. Another benefit is that this approach may be applied in different domains by changing the CSC model without retraining the original ASR model. Further, the CSC model may be light weight, easing deployment and facilitating operation in resource-constrained environments.

In some examples, each audio utterance produces multiple speech recognition hypotheses, and the top K are selected for possible post-processing (spelling correction). A determination is made by a hypothesis filter whether to perform the post-processing based on (at least) these speech recognition hypotheses. If so, the speech recognition hypotheses and an initial context list pass through a context list filter to obtain a pre-selected context list. The speech recognition hypotheses and the pre-selected context list pass through the CSC model to obtain the final results. Otherwise, the post-processing is skipped.

FIG. 1 illustrates an arrangement 100 for speech recognition that advantageously employs CSC for ASR. An audio stream 102 is received (captured) by a microphone 104 from a speaker 106 for ASR and produces an output text sequence 170 that is passed to a digital assistant 180 or a transcription service 190. Output text sequence 170 is advantageously subjected to CSC so that output text sequence 170 correctly matches the spelling of even obscure words in a context list 160.

Audio stream 102 is received and segmented by an audio segmenter 108 into a plurality of audio segments 110. As shown, plurality of audio segments 110 includes an audio segment 111, an audio segment 112, and an audio segment 113. Audio segment 111 is "What time is my meeting with Aliza Friedman" This would be interpreted by digital assistant 180 as an inquiry to a calendar function 183. The name "Aliza Friedman" is illustrated in bold typeface for emphasis because, in this example, "Aliza Friedman" is misspelled as "Alyssa Friedman" by an ASR model 120. If permitted to persist, this misspelling could result in an incorrect answer from digital assistant 180, because calendar function 183 would be searching for an event listing "Alyssa Friedman" as a participant, rather than searching for an event listing "Aliza Friedman" as a participant.

ASR model 120 is illustrated as having an encoder and a decoder, each of which may comprise a neural network (NN). In some examples, ASR model 120 comprises a recurrent neural network transducer (RNN-T) that performs end-to-end (E2E) ASR. ASR model 120 outputs text sequences as ASR hypotheses 130, which is illustrated as including an ASR hypothesis 131, an ASR hypothesis 132, and an ASR hypothesis 131. In some example, a plurality of ASR hypotheses are generated for a single utterance (segmented as one of audio segments 110). In the illustrated example, ASR hypothesis 131-133 all correspond with audio segment 111. ASR hypothesis 131 is "What time is my meeting with Alyssa Friedman" (a misspelling of "Aliza"). ASR hypothesis 132 is "What time is my meeting with Aliza Friedman" (a misspelling of "Friedman") ASR hypothesis 133 is "What time is my meeting with Alysa Friend man" (misspellings of both "Aliza" and "Friedman").

Each of ASR hypotheses 130 is scored. For example, ASR hypothesis 131 ("What time is my meeting with Alyssa Friedman") has a score of −0.1, ASR hypothesis 132 ("What time is my meeting with Aliza Friedman") has a score of −0.2, and ASR hypothesis ("What time is my meeting with Alysa Friend man") has a score of −0.3. The scoring vector is then [−0.1, −0.2, −0.3], enabling ranking of ASR hypotheses 131-133.

To address potential problems with general domain regression for large context lists, top-ranked ASR hypotheses 130 are passed to a two-stage filter 140. For example, this may include ASR hypothesis 131 and ASR hypothesis 132, but not ASR hypotheses 133, if only the top two are passed. Filter 140 includes a domain classifier 142 acts as an ASR hypothesis filter and determines whether to trigger spelling correction (e.g., CSC) for any ASR hypotheses. If either ASR hypothesis 131 or ASR hypothesis 132 triggers spelling correction, both of ASR hypothesis 131 and ASR hypothesis 132 will be sent to a context filter 144 and then to a CSC model 200 for spelling correction. If neither ASR hypothesis 131 nor ASR hypothesis 132 triggers spelling correction, context filter 144 and CSC model 200 are skipped.

Context filter 144 performs context preselection and includes a relevance ranker 146 that receives a relatively large initial context list 150 and a preference ranker 148 that intakes a context rank weight 156. In some examples, initial context list 150 comprises a contact list 152 of personal names, location names (e.g., street names and city names that might have uncommon spelling) and/or a specialized terms list 154 (e.g., medical, legal, financial, or other terminology). Context filter 144 considers the similarity between the ASR hypothesis 131 and/or and ASR hypothesis 131 and items in initial context list 150 (based on (as determined by relevance ranker 146) and preference information (as determined by preference ranker 148).

Relevance ranker 146 comprises an edit distance filter and is used to constrain the context number according to the edit distance between initial context list 150 and ASR input (ASR hypothesis 131 or and ASR hypothesis 132), in order to speed up model decoding. Edit distance filtering is described by:

$$W_r^j = -\frac{\min_i(editdistance(x_j, s_i))}{len(x_j)} \qquad \text{Eq. (1)}$$

where $s_i$ is a segment cut off from input text with the same length of a certain context phrase $x_j$ beginning from the i-th word, and $W_r^j$ is the relevance ranker weight of the j-th context phrase. In some scenarios, context phrase hidden state representations of a certain user (e.g., speaker 106) may be generated ahead of time to reduce inference cost.

Context rank weight 156 reflects a user's preference, for example, indicated by the frequency of usage of a particular context list item (e.g., contact name). In some examples, context rank weight 156 is used together with the edit distance filter weight to preselect context, for example narrowing initial context list 150 down to preselected context list 160. The final (preselected) context list 160, from preference ranker 148 is selected according to:

$$c = topN(k*w_r + w_p) \qquad \text{Eq. (2)}$$

where c is the selected context phrase list, $w_r$ is relevance ranker weight, and $w_p$ is preference ranker weight, k is a weight to adjust the contributions of the two weights. In some examples, k is set to 0.5. This narrowing of initial context list 150 down to context list 160 occurs for each set of ASR hypotheses selected for spelling correction.

The top ASR hypotheses, ASR hypothesis 131 and ASR hypothesis 132, are passed to CSC model 200, which is illustrated and described in further detail in relation to FIGS.

2-5. CSC model 200 receives at least a portion initial context list 150 as (preselected) context list 160, for example a contact name 161 identifying "Aliza Friedman", possibly along with other similar contact names, such as a contact name 162 and a contact name 163.

As described below, CSC model 200 corrects the spelling of "Alyssa Friedman" to "Aliza Friedman" in a corrected ASR hypothesis 131a and outputs it as output text sequence 170. The final decoding results are obtained by ranking the ASR hypotheses:

$$H^* = \mathrm{argmax}(\lambda_{SR} \log P_i + \lambda_{CSC} \log P_{ij}) \quad \text{Eq. (3)}$$

where $\lambda_{SR}$ and $\lambda_{CSC}$ are the weights for ASR and CSC scores. In some examples, a set of CSC hypotheses {Hi1, Hi2, . . . , HiN} is generated by a beam search mechanism.

Depending on the particular ASR task, output text sequence 170 is provided to digital assistant 180 and/or transcription service 190. Digital assistant 180 is configured to perform various actions with output text sequence 170, such as placing phone calls, generating messages, and performing calendar operations, using a phone function 181, a messaging function 182, calendar function 183, and/or another function. Transcription service 190 generates a transcript 192 of audio stream 102.

Figure 2:
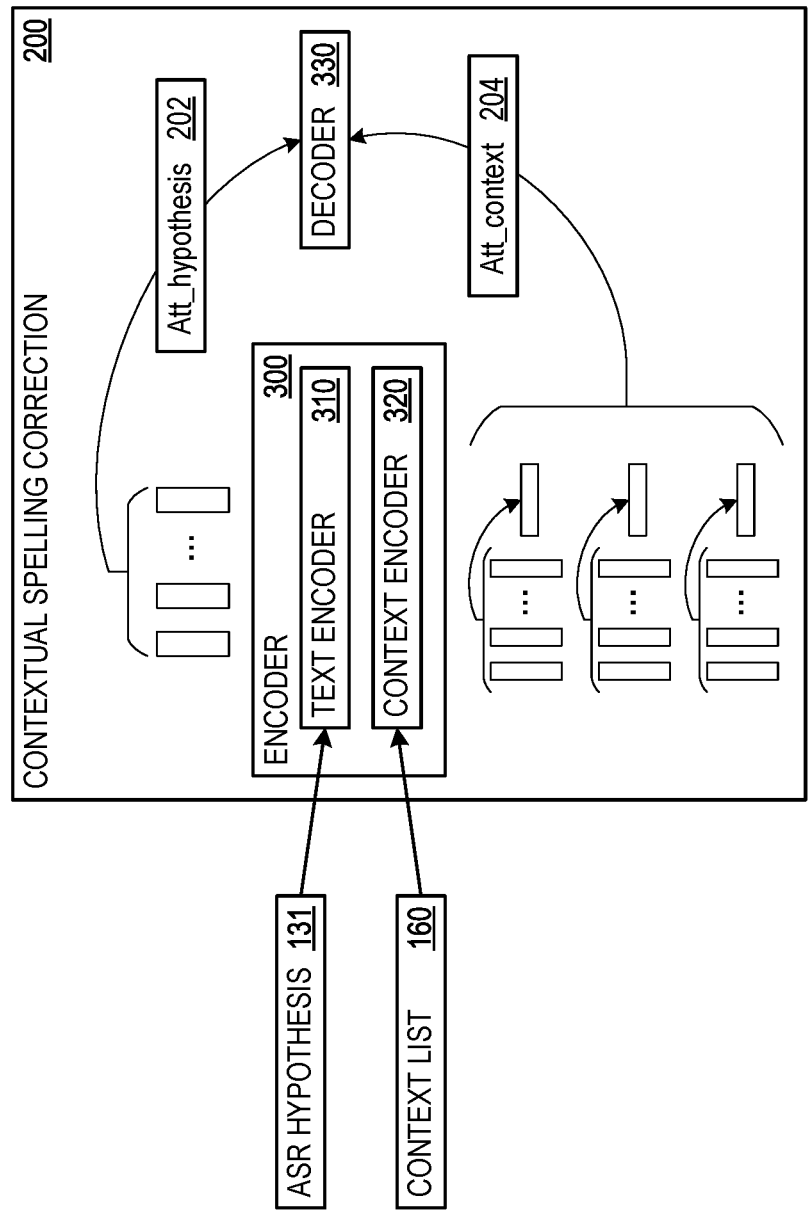
FIG. 2 illustrates the CSC model shown in FIG. 1, with further detail.

Turning now to FIG. 2, CSC model 200 is described in further detail. CSC model 200 is a sequence-to-sequence (seq2seq) model with an encoder 300 and a decoder 330. Encoder 300 includes a text encoder 310, and a context encoder 320. Text encoder 310 takes ASR hypothesis 131 as input, and context encoder 320 takes context list 16 as input. Context encoder 320 extracts context phrase embeddings. Decoder 330 attends to both encoders 310 and 320, obtains information from ASR hypothesis 131 and context list 160 to correct contextual misspelling errors. As indicated an attention network hypothesis 202 and an attention network context 204 are provided to decoder 330. Text encoder 310 and context encoder 320 share parameters. To consider contextual information during spelling correction, context encoder 320 encodes context phrases into hidden embeddings. In some examples, teacher-student learning and quantization are used, in order to provide a light weight model (e.g., relatively fast and small).

Figure 3:
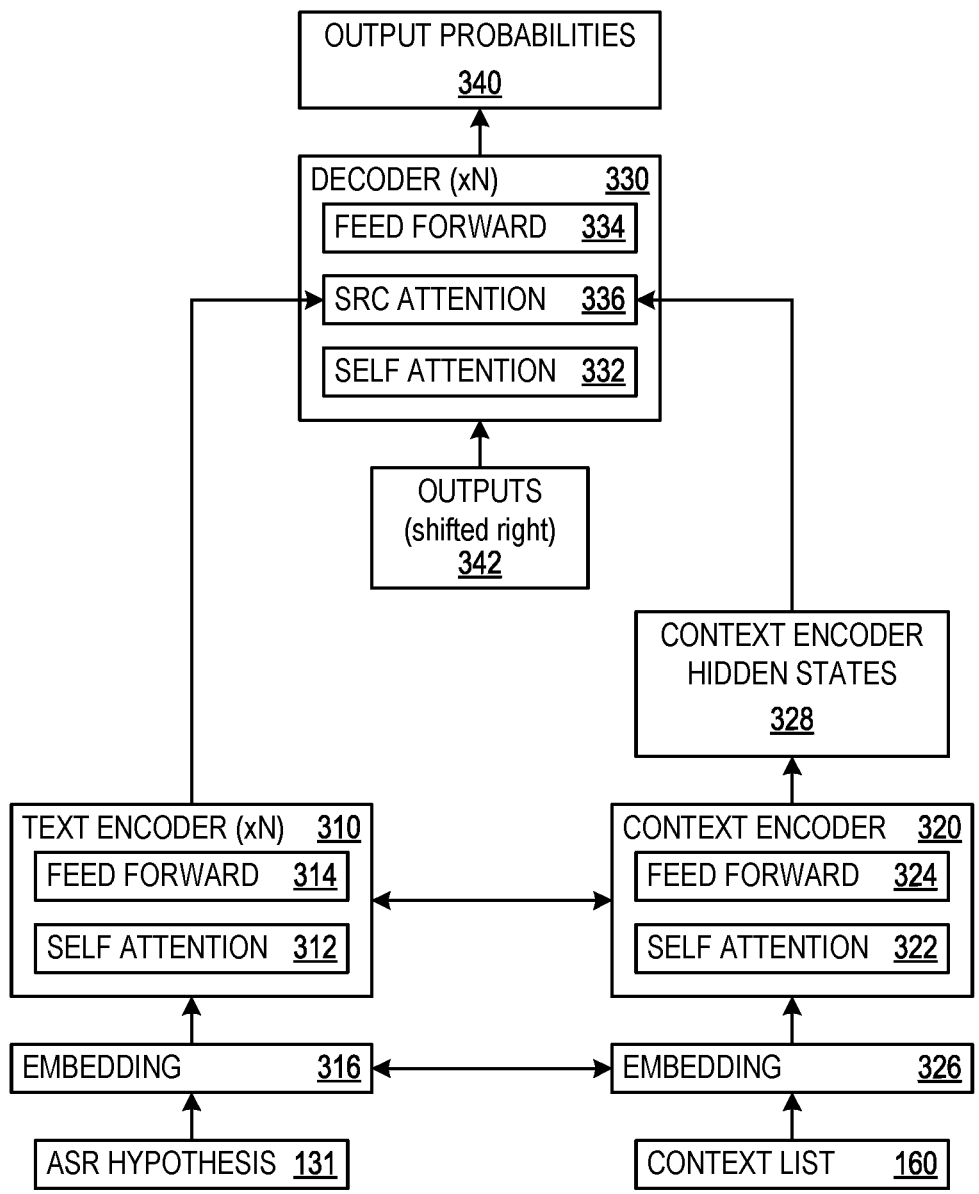
FIG. 3 illustrates further detail for the CSC model of FIG. 2.

FIG. 3 illustrates further detail for text encoder 310, context encoder 320 and decoder 330. In some examples, the components are transformer-based and the parameters of the two encoders (text encoder 310 and context encoder 320) are shared. ASR hypothesis 131 provides embedding 316 for text encoder 310 (which may have N instances). Text encoder 310 may comprise one or more NNs and is illustrated as having a self-attention network 312 and a feed forward network 314.

Context list 160 provides embedding 326 for context encoder 320. Context encoder 320 may comprise one or more NNs and is illustrated as having a self-attention network 322 and a feed forward network 324. The output of context encoder 320 provides context encoder hidden states 328, which are the hidden states (representations) of context encoder 320. Context encoder hidden states 328 and the output of text encoder 310 are provided to a speech recognition context attention network 336 within decoder 330. Sharing parameters for text encoder 310 and context encoder 320 renders the arrangement equivalent to using a single encoder network. In some examples, using a single encoder is feasible because ASR hypothesis text and context phrases are both transcriptions that could be processed by a same network. In some scenarios, such as a domain with personal names, the training context list (e.g., training context list 722 of FIG. 7) is not sufficiently large to cover all possible word tokens or patterns, so using the same network may enable context encoder 320 and text encoder 310 to benefit from each other. Additionally, a single encoder network may make CSC model 200 smaller.

Decoder 330 (which also may have N instances) may comprise one or more NNs and is illustrated as also having a self-attention network 332 and a feed forward network 334. Decoder 330 outputs output probabilities 340, which are right-shifted and returned as feedback outputs 342.

Figure 4:
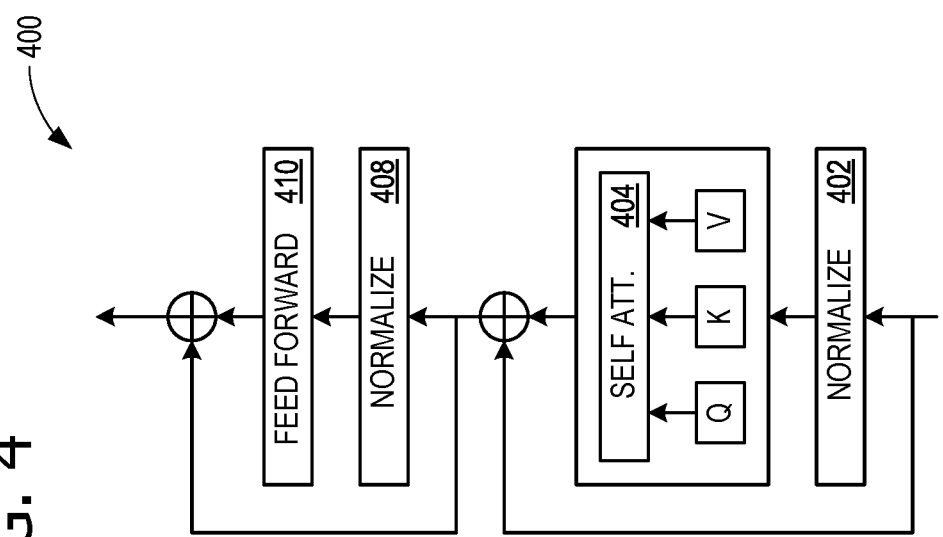
FIG. 4 also illustrates further detail for the CSC model of FIG. 2.

FIG. 4 illustrates a block encoder 400 that may be used as text encoder 310 and/or context encoder 320. Input is fed to a normalization stage 402 and then to a self-attention network 404 (e.g., self-attention network 312 or 322). At each decoding step, a query vector Q also pays attention to the user's context phrase embeddings. This attention is added to the attention of text encoder 310 to generate the final attention during decoding. A key vector K and a value vector V may also be used. Knowledge distillation and quantization are also adopted to further reduce the model size and improve the inference efficiency. The student model has the same structure as the teacher model with smaller hidden state dimensions.

The output of self-attention network 404 is summed with the input and fed to another normalization stage 408 and then to a feed forward network 410 (e.g., feed forward network 314 or 324). The output of feed forward network 410 is then summed with the input to normalization stage 408.

Figure 5:
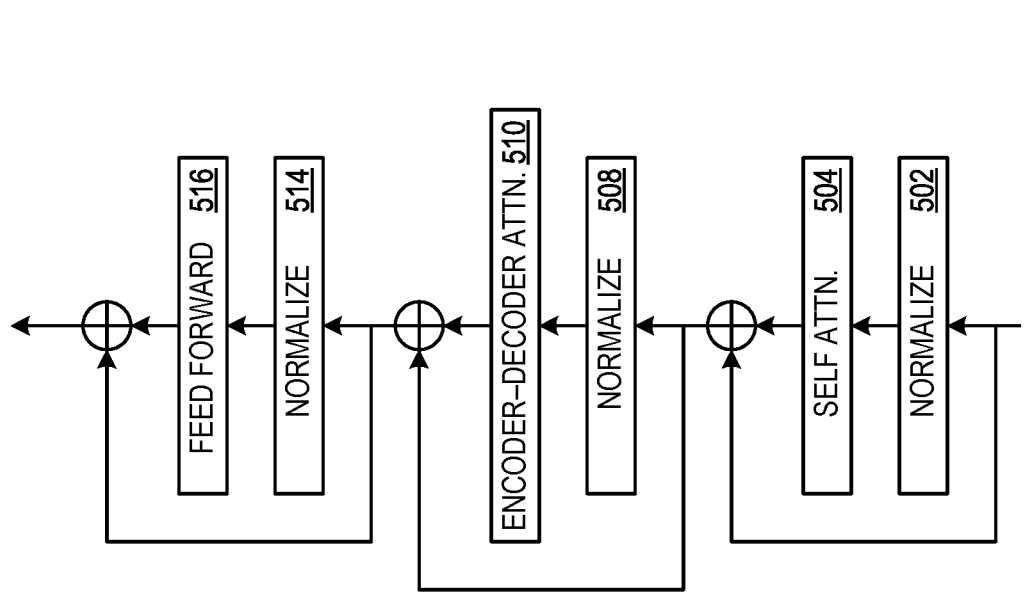
FIG. 5 also illustrates further detail for the CSC model of FIG. 2.

FIG. 5 illustrates a block decoder 500 that may be used as decoder 330. Input is fed to a normalization stage 502 and then to a self-attention network 504 (e.g., self-attention network 332). The output of self-attention network 504 is summed with the input and fed to another normalization stage 508 and then to an encoder-decoder attention network 510 (e.g., attention network 336). The output of encoder-decoder attention network 510 is then summed with the input to normalization stage 508 and fed to another normalization stage 514. The output of normalization stage 514 is then to a feed forward network 516 (e.g., feed forward network 334). The output of feed forward network 516 is then summed with the input to normalization stage 514.

Figure 6:
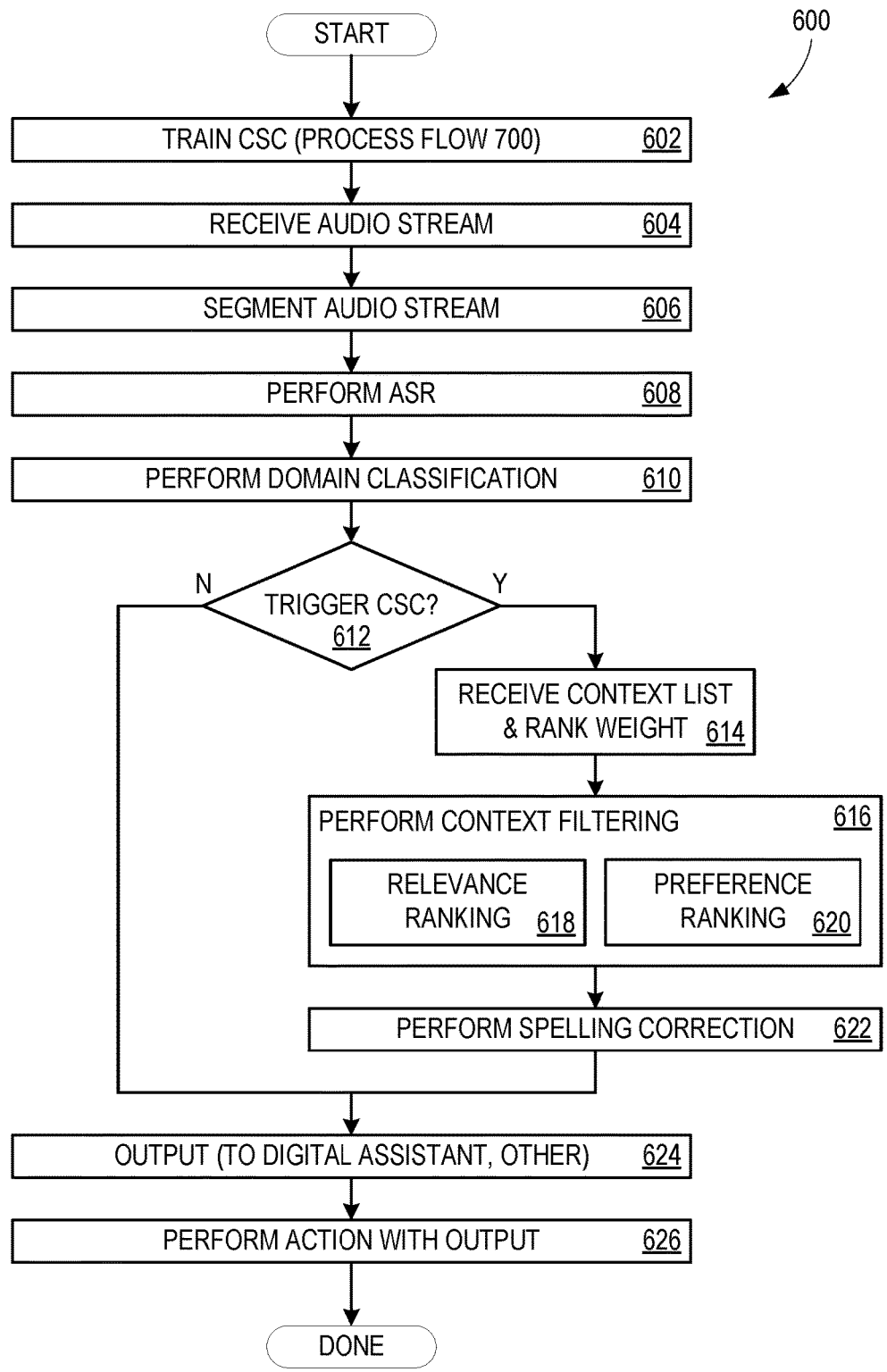
FIG. 6 is a flowchart illustrating exemplary operations associated with the arrangement of FIG. 1.

FIG. 6 is a flowchart 600 illustrating exemplary operations involved in performing speech recognition. In some examples, operations described for flowchart 600 are performed by computing device 900 of FIG. 9. Flowchart 600 commences with operation 602, which includes training CSC model 200 (a contextual spell checker), as described for process flow 700 of FIG. 7. Operation 604 includes receiving audio stream 102, and operation 606 includes segmenting audio stream 102 into plurality of audio segments 110. Operation 608 includes performing an ASR process on audio stream 102 to produce ASR hypothesis 131 which, in some examples, comprises a text sequence. In some examples, performing the ASR process comprises performing ASR with an NN. In some examples, ASR hypothesis 131 comprises a hypothesis of speech in audio segment 111 of plurality of audio segments 110.

Operation 610 performs domain classification, which filters ASR hypotheses 130, including ASR hypothesis 131 and ASR hypothesis 132. Decision operation 612 uses the results of filtering operation 610 to, based on at the ASR hypotheses filtering of operation 610, determine whether to trigger spelling correction for ASR hypothesis 131. If spelling correction is not triggered, flowchart 600 skips CSC and jumps to operation 624 in which ASR hypothesis 131 (the top-ranked ASR hypothesis) is output as output text sequence 170. This does not mean that other spelling correction or word substitution is not used at all (e.g., transcript 192 may be subjected to other spell check or automated editing processes), but only that applied ASR hypothesis 131 is not passed through CSC model 200. Operation 624 is described in further detail below.

If spelling correction is triggered, CSC model 200 receives ASR hypothesis 131, ASR hypothesis 132, and context list 160 in operation 614. In some examples, context list 160 comprises a plurality of text sequences, for example, contact names 161-163, location names, and or a dictionary of specialized terms. Operation 616 includes performing context filtering and is accomplished, at least in part, using operations 618 and 620. Operation 618 ranks ASR hypotheses 131 and 132 using relevance ranker 146, and operation 620 ranks preference using preference ranker 148.

Operation 622 includes, based on at least determining to trigger spelling correction for ASR hypothesis 131 (and ASR hypothesis 132), performing spelling correction to produce output text sequence 170. In some examples, the spelling correction comprises CSC. In some examples, performing spelling correction comprises performing spelling correction with an NN (e.g., within CSC model 200). In some examples, performing spelling correction comprises inputting ASR hypothesis 131 into text encoder 310 and/or inputting context list 160 into context encoder 320. As part of operation 622, context encoder 320 extracts context phrase embeddings. In some examples, performing spelling correction comprises passing an output of text encoder 310 and an output of context encoder 320 into decoder 330.

Digital assistant 180 and/or transcription service 190 receives the corrected ASR hypothesis 131a as output text sequence 170 in operation 624, or the top-ranked ASR hypothesis 131, if spelling correction had not been triggered in decision operation 612. Operation 626 includes performing an action with output text sequence 170. In some examples, the action is selected from the list consisting of generating transcript 192 of audio stream 102, initiating a phone call with a contact identified in audio stream 102, generating a message to a contact identified in audio stream 102, and responding to a query within audio stream 102.

Figure 7:
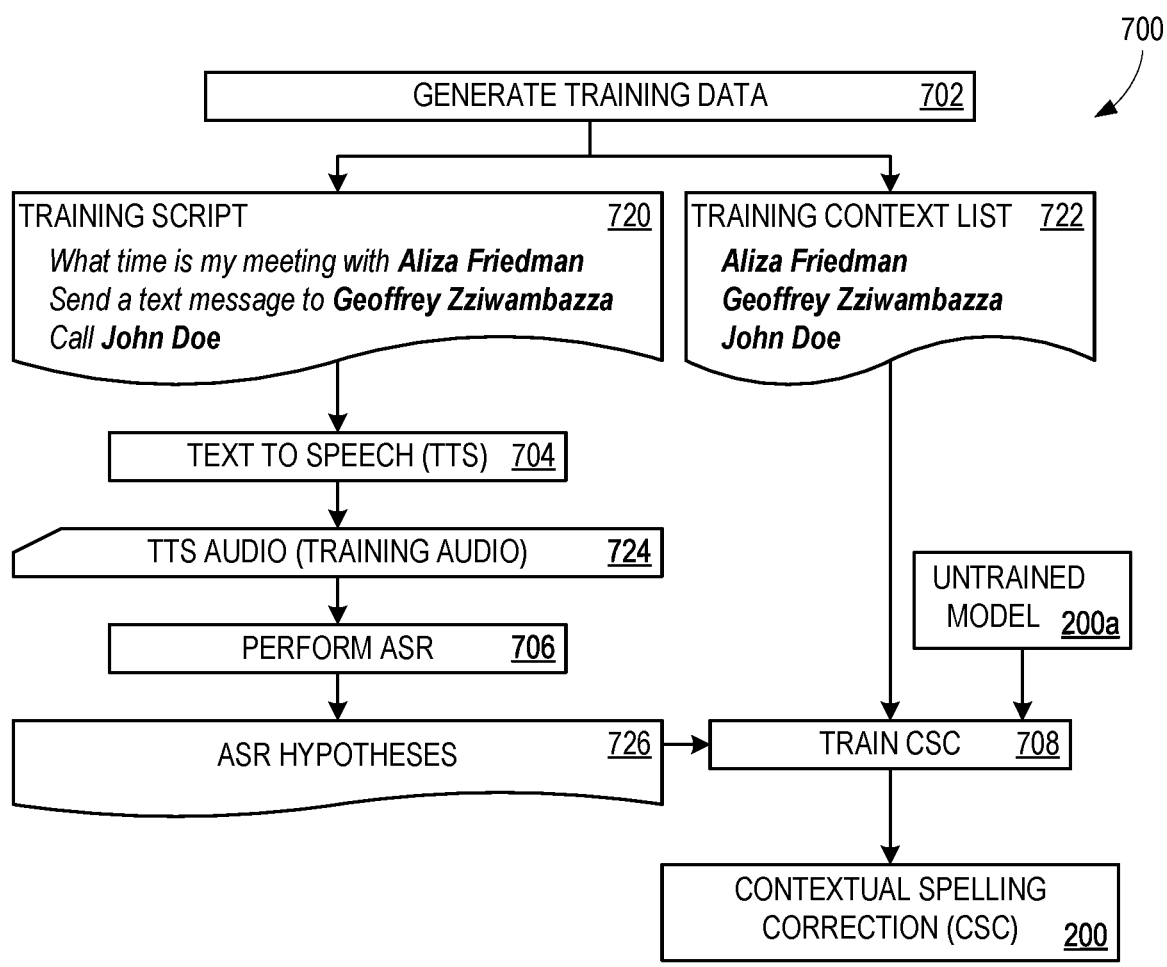
FIG. 7 is a process flow diagram illustrating exemplary operations and data involved in training the CSC model of FIG. 2.

FIG. 7 is a diagram of a process flow 700 illustrating exemplary operations and data involved in training CSC model 200. In some examples, operations described for process flow 700 are performed by computing device 900 of FIG. 9. Process flow 700 commences with operation 702, which generates training data, for example a training script 720 and a training context list 722. Training script 720 is a preprocessed transcription with context phrases, constructed by combining sentence patterns with name tokens (or other context phrases), such as "Call <Person Name>" and "Do I have any emails from <Person Name>?" In some examples, the contents of training context list 722 are randomly selected from a source of context phrases.

A text to speech (TTS) operation 704 generates TTS audio (a training audio stream 724) from training script 720. Operation 706 performs ASR to generate an ASR hypothesis 726 with error patterns. ASR hypothesis 726 is input into a CSC training operation 708, using training context list 722 as the ground truth to train an untrained CSC model 200a. This produces the trained version of CSC model 200.

In some examples, after teacher model training, knowledge distillation is also adopted to further reduce the model size and improve the inference efficiency. This enables use of CSC model 200 on devices with tight computational resource constraints. In some examples, the loss function of the student model is:

$$L = \alpha L_{soft} + (1-\alpha)L_{hard} \quad \text{Eq. (4)}$$

$$L_{hard} = \text{cross\_entropy}(y'_S, y) \quad \text{Eq. (5)}$$

$$L_{soft} = KL\left(\text{softmax}\left(\frac{y'_S}{T}\right), \text{softmax}\left(\frac{y'_T}{T}\right)\right) * T^2 \quad \text{Eq. (6)}$$

where $L_{hard}$ is the cross-entropy loss of student model output $y_s'$ and reference y, $L_{soft}$ is the KL-divergence of student model output $y_s'$ and teacher model output $y_T'$, T is the temperature parameter, and $\alpha$ is a weight value.

Figure 8:
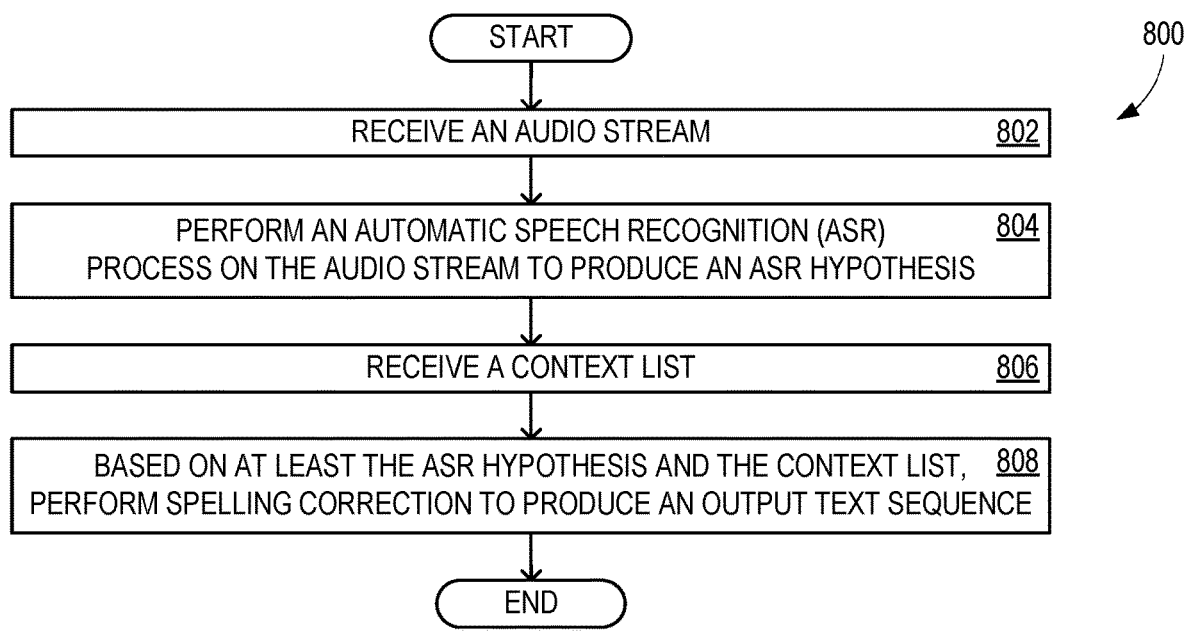
FIG. 8 is another flowchart illustrating exemplary operations associated with the arrangement of FIG. 1.

FIG. 8 is a flowchart 800 that illustrates exemplary operations involved in performing speech recognition. In some examples, operations described for flowchart 800 are performed by computing device 900 of FIG. 9. Flowchart 800 commences with operation 802, which includes receiving an audio stream. Operation 804 includes performing an ASR process on the audio stream to produce an ASR hypothesis. Operation 806 includes receiving a context list. Operation 808 includes, based on at least the ASR hypothesis and the context list, performing spelling correction to produce an output text sequence.

Additional Examples

An example method of speech recognition comprises: receiving an audio stream; performing an automatic speech recognition (ASR) process on the audio stream to produce an ASR hypothesis; receiving a context list; based on at least the ASR hypothesis and the context list, performing spelling correction to produce an output text sequence;

An example system for speech recognition comprises: a processor; and a computer-readable medium storing instructions that are operative upon execution by the processor to: receive an audio stream; perform an automatic speech recognition (ASR) process on the audio stream to produce an ASR hypothesis; receive a context list; based on at least the ASR hypothesis and the context list, perform spelling correction to produce an output text sequence.

One or more example computer storage devices has computer-executable instructions stored thereon, which, on execution by a computer, cause the computer to perform operations comprising: receiving an audio stream; performing an automatic speech recognition (ASR) process on the audio stream to produce an ASR hypothesis; receiving a context list; based on at least the ASR hypothesis and the context list, performing spelling correction to produce an output text sequence.

Alternatively, or in addition to the other examples described herein, examples may include any combination of the following:

- the spelling correction comprises contextual spelling correction (CSC);
- performing an action with the output text sequence, wherein the action is selected from the list consisting of generating a transcript of the audio stream, initiating a phone call with a contact identified in the audio stream, generating a message to a contact identified in the audio stream, and responding to a query within the audio stream;
- performing spelling correction comprises inputting the ASR hypothesis into a text encoder;
- performing spelling correction comprises inputting the context list into a context encoder;

performing spelling correction comprises passing an output of the text encoder and an output of the context encoder into a decoder;

filtering ASR hypotheses for the audio stream;

based on at least the ASR hypotheses filtering, determining whether to trigger spelling correction for the ASR hypothesis;

performing spelling correction to produce the output text sequence comprises, based on at least determining to trigger spelling correction for the ASR hypothesis, performing spelling correction to produce the output text sequence;

based on at least determining to not trigger spelling correction for the ASR hypothesis, outputting the ASR hypothesis as the output text sequence;

training a contextual spell checker, wherein the training comprises generating TTS audio using preprocessed transcriptions with context phrases;

the ASR hypothesis comprises a text sequence;

the context list comprises a text sequence;

the context list comprises contact names in a contact list;

the context list comprises location names;

the context list comprises a dictionary of specialized terms;

segmenting the audio stream into a plurality of audio segments, wherein the ASR hypothesis comprises a hypothesis of speech in an audio segment of the plurality of audio segments;

receiving, by a digital assistant, the output text sequence;

performing the ASR process comprises performing ASR with an NN;

performing spelling correction comprises performing spelling correction with an NN;

performing context filtering;

performing context filtering comprises ranking relevance and preference; and extracting context phrase embeddings.

While the aspects of the disclosure have been described in terms of various examples with their associated operations, a person skilled in the art would appreciate that a combination of operations from any number of different examples is also within scope of the aspects of the disclosure.

Example Operating Environment

Figure 9:
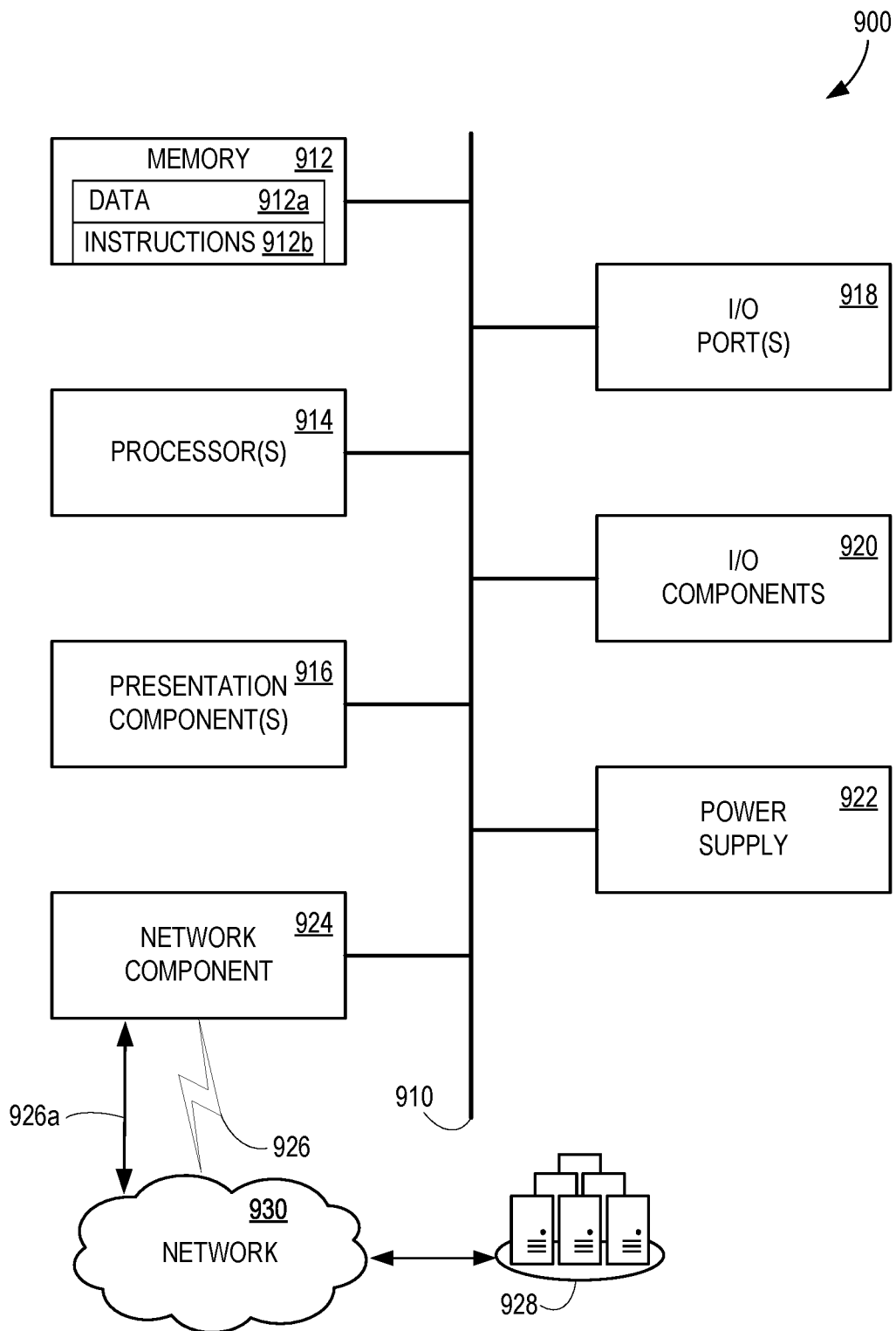
FIG. 9 is a block diagram of an example computing environment suitable for implementing some of the various examples disclosed herein.

FIG. 9 is a block diagram of an example computing device 900 for implementing aspects disclosed herein, and is designated generally as computing device 900. Computing device 900 is but one example of a suitable computing environment and is not intended to suggest any limitation as to the scope of use or functionality of the examples disclosed herein. Neither should computing device 900 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 900 includes a bus 910 that directly or indirectly couples the following devices: computer-storage memory 912, one or more processors 914, one or more presentation components 916, I/O ports 918, I/O components 920, a power supply 922, and a network component 924. While computing device 900 is depicted as a seemingly single device, multiple computing devices 900 may work together and share the depicted device resources. For example, memory 912 may be distributed across multiple devices, and processor(s) 914 may be housed with different devices.

Bus 910 represents what may be one or more busses (such as an address bus, data bus, or a combination thereof). Although the various blocks of FIG. 9 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 9 and the references herein to a "computing device." Memory 912 may take the form of the computer-storage media references below and operatively provide storage of computer-readable instructions, data structures, program modules and other data for the computing device 900. In some examples, memory 912 stores one or more of an operating system, a universal application platform, or other program modules and program data. Memory 912 is thus able to store and access data 912a and instructions 912b that are executable by processor 914 and configured to carry out the various operations disclosed herein.

In some examples, memory 912 includes computer-storage media in the form of volatile and/or nonvolatile memory, removable or non-removable memory, data disks in virtual environments, or a combination thereof. Memory 912 may include any quantity of memory associated with or accessible by the computing device 900. Memory 912 may be internal to the computing device 900 (as shown in FIG. 9), external to the computing device 900 (not shown), or both (not shown). Examples of memory 912 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 900. Additionally, or alternatively, the memory 912 may be distributed across multiple computing devices 900, for example, in a virtualized environment in which instruction processing is carried out on multiple devices 900. For the purposes of this disclosure, "computer storage media," "computer-storage memory," "memory," and "memory devices" are synonymous terms for the computer-storage memory 912, and none of these terms include carrier waves or propagating signaling.

Processor(s) 914 may include any quantity of processing units that read data from various entities, such as memory 912 or I/O components 920. Specifically, processor(s) 914 are programmed to execute computer-executable instructions for implementing aspects of the disclosure. The instructions may be performed by the processor, by multiple processors within the computing device 900, or by a processor external to the client computing device 900. In some examples, the processor(s) 914 are programmed to execute instructions such as those illustrated in the flow charts discussed below and depicted in the accompanying drawings. Moreover, in some examples, the processor(s) 914 represent an implementation of analog techniques to perform the operations described herein. For example, the operations may be performed by an analog client computing device 900 and/or a digital client computing device 900. Presentation component(s) 916 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 900, across a wired connection, or in other ways. I/O ports 918 allow computing device 900 to be logically coupled to other devices including I/O components 920, some of which may be built in. Example I/O components 920 include, for example but without limitation, a microphone, joystick, game pad, satellite dish, scanner, printer, wireless device, etc.

The computing device 900 may operate in a networked environment via the network component 924 using logical connections to one or more remote computers. In some examples, the network component 924 includes a network interface card and/or computer-executable instructions (e.g., a driver) for operating the network interface card. Communication between the computing device 900 and other devices may occur using any protocol or mechanism over any wired or wireless connection. In some examples, network component 924 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 924 communicates over wireless communication link 926 and/or a wired communication link 926*a* to a cloud resource 928 across network 930. Various different examples of communication links 926 and 926*a* include a wireless connection, a wired connection, and/or a dedicated link, and in some examples, at least a portion is routed through the internet.

Although described in connection with an example computing device 900, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of speech recognition, the method comprising: receiving an audio stream;
performing an automatic speech recognition (ASR) process on the audio stream to produce an ASR hypothesis as a text sequence;
receiving an initial context list;
performing context filtering, wherein the context filtering comprises narrowing down the
initial context list into a preselected context list based on a user's preference, wherein the context filtering comprises adjusting contribution of a relevance weight and a preference weight, the relevance weight comprising an edit distance between the initial context list and the ASR hypothesis, and the preference weight indicating a frequency of usage of a particular context list item; and
based on at least the ASR hypothesis and the context list, performing spelling correction to produce an output text sequence, wherein performing the spelling correction further comprises:
inputting the text sequence into a text encoder;
inputting the preselected context list into a context encoder; and
passing an output of the text encoder and an output of the context encoder into a decoder.

2. The method of claim 1, further comprising:
performing an action with the output text sequence, wherein the action is selected from the list consisting of:
generating a transcript of the audio stream, initiating a phone call with a contact identified in the audio stream, generating a message to a contact identified in the audio stream, and responding to a query within the audio stream.

3. The method of claim 1, wherein the context encoder and the text encoder share a set of parameters.

4. The method of claim 1, further comprising: filtering ASR hypotheses for the audio stream;
based on at least the ASR hypotheses filtering, determining whether to trigger spelling correction for the ASR hypothesis;
wherein performing spelling correction to produce the output text sequence comprises: based on at least determining to trigger spelling correction for the ASR hypothesis, performing spelling correction to produce the output text sequence; and
based on at least determining to not trigger spelling correction for the ASR hypothesis, outputting the ASR hypothesis as the output text sequence.

5. The method of claim 1, further comprising:
training a contextual spell checker, wherein the training comprises generating text to speech (TTS) audio using preprocessed transcriptions with context phrases.

6. The method of claim 1, further comprising:
segmenting the audio stream into a plurality of audio segments, wherein the ASR hypothesis comprises a hypothesis of speech in an audio segment of the plurality of audio segments.

7. A system for speech recognition, the system comprising: a processor; and
a computer-readable medium storing instructions that are operative upon execution by the processor to:
receive an audio stream;
perform an automatic speech recognition (ASR) process on the audio stream to produce an ASR hypothesis as a text sequence;
receive an initial context list;
perform context filtering, wherein the context filtering comprises narrowing down
the initial context list into a preselected context list based on a user's preference, wherein the context filtering comprises adjusting contribution of a relevance weight and a preference weight, the relevance weight comprising an edit distance between the initial context list and the ASR hypothesis, and the preference weight indicating a frequency of usage of a particular context list item; and
based on at least the ASR hypothesis and the context list, perform spelling correction to produce an output text sequence, wherein performing the spelling correction further comprises:
inputting the text sequence into a text encoder;
inputting the preselected context list into a context encoder; and
passing an output of the text encoder and an output of the context encoder into a decoder.

8. The system of claim 7, wherein the instructions are further operative to: perform an action with the output text sequence, wherein the action is selected from the list consisting of:
generating a transcript of the audio stream, initiating a phone call with a contact identified in the audio stream, generating a message to a contact identified in the audio stream, and responding to a query within the audio stream.

9. The system of claim 7, wherein the context encoder and the text encoder share a set of parameters.

10. The system of claim 7, wherein the instructions are further operative to: filter ASR hypotheses for the audio stream;
based on at least the ASR hypotheses filtering, determine whether to trigger spelling correction for the ASR hypothesis;
wherein performing spelling correction to produce the output text sequence comprises: based on at least determining to trigger spelling correction for the ASR hypothesis, performing spelling correction to produce the output text sequence; and
based on at least determining to not trigger spelling correction for the ASR hypothesis, output the ASR hypothesis as the output text sequence.

11. The system of claim 7, wherein the instructions are further operative to:
train a contextual spell checker, wherein the training comprises generating text to speech (TTS) audio using preprocessed transcriptions with context phrases.

12. The system of claim 7, wherein the instructions are further operative to: segment the audio stream into a plurality of audio segments,
wherein the ASR hypothesis comprises a hypothesis of speech in an audio segment of the plurality of audio segments.

13. One or more computer storage devices having computer-executable instructions stored thereon, which, on execution by a computer, cause the computer to perform operations comprising:
- receiving an audio stream;
- performing an automatic speech recognition (ASR) process on the audio stream to produce an ASR hypothesis as a text sequence;
- receiving an initial context list;
- performing context filtering, wherein the context filtering comprises narrowing down the
initial context list into a preselected context list based on a user's preference, wherein the context filtering comprises adjusting contribution of a relevance weight and a preference weight, the relevance weight comprising an edit distance between the initial context list and the ASR hypothesis, and the preference weight indicating a frequency of usage of a particular context list item; and
- based on at least the ASR hypothesis and the context list, performing spelling correction to produce an output text sequence, wherein performing the spelling correction further comprises:
  - inputting the text sequence into a text encoder;
  - inputting the preselected context list into a context encoder; and
  - passing an output of the text encoder and an output of the context encoder into a decoder.

14. The one or more computer storage devices of claim 13, wherein the operations further comprise:
performing an operation with the output text sequence, wherein the operation is selected from the list consisting of:
generating a transcript of the audio stream, initiating a phone call with a contact identified in the audio stream, generating a message to a contact identified in the audio stream, and responding to a query within the audio stream.

15. The one or more computer storage devices of claim 13, wherein
the context encoder and the text encoder share a set of parameters.

16. The one or more computer storage devices of claim 13, wherein the operations further comprise:
filtering ASR hypotheses for the audio stream;
based on at least the ASR hypotheses filtering, determining whether to trigger spelling correction for the ASR hypothesis;
wherein performing spelling correction to produce the output text sequence comprises: based on at least determining to trigger spelling correction for the ASR hypothesis, performing spelling correction to produce the output text sequence; and
based on at least determining to not trigger spelling correction for the ASR hypothesis, outputting the ASR hypothesis as the output text sequence.

17. The one or more computer storage devices of claim 13, wherein the operations further comprise:
training a contextual spell checker, wherein the training comprises generating text to speech (TTS) audio using preprocessed transcriptions with context phrases.

18. The one or more computer storage devices of claim 13, wherein the operations further comprise:
segmenting the audio stream into a plurality of audio segments, wherein the ASR hypothesis comprises a hypothesis of speech in an audio segment of the plurality of audio segments.

* * * * *